United States Patent
Tamari et al.

(10) Patent No.: US 12,215,255 B2
(45) Date of Patent: Feb. 4, 2025

(54) BIAXIALLY ORIENTED POLYESTER FILM AND LAMINATED BODY

(71) Applicant: TOYOBO CO., LTD., Osaka (JP)

(72) Inventors: Noboru Tamari, Inuyama (JP); Masayuki Haruta, Inuyama (JP)

(73) Assignee: TOYOBO CO., LTD., Osaka (JP)

( * ) Notice: Subject to any disclaimer, the term of this patent is extended or adjusted under 35 U.S.C. 154(b) by 84 days.

(21) Appl. No.: 18/247,974

(22) PCT Filed: Oct. 4, 2021

(86) PCT No.: PCT/JP2021/036623
§ 371 (c)(1),
(2) Date: Apr. 5, 2023

(87) PCT Pub. No.: WO2022/075260
PCT Pub. Date: Apr. 14, 2022

(65) Prior Publication Data
US 2023/0374349 A1    Nov. 23, 2023

(30) Foreign Application Priority Data
Oct. 7, 2020 (JP) ................... 2020-169653

(51) Int. Cl.
C09J 7/25       (2018.01)
B65D 65/40      (2006.01)
C09J 167/03     (2006.01)

(52) U.S. Cl.
CPC .............. C09J 7/255 (2018.01); B65D 65/40 (2013.01); C09J 167/03 (2013.01);
(Continued)

(58) Field of Classification Search
CPC .... C09J 7/255; C09J 167/03; C09J 2301/122; C09J 2301/312; C09J 2301/414; C09J 2400/163
See application file for complete search history.

(56) References Cited

U.S. PATENT DOCUMENTS

| | | |
|---|---|---|
| 2013/0295377 A1 | 11/2013 | Manabe et al. |
| 2014/0193648 A1 | 7/2014 | Okuzu et al. |
| 2018/0272594 A1 | 9/2018 | Akamatsu et al. |

FOREIGN PATENT DOCUMENTS

| | | |
|---|---|---|
| JP | 2918775 B2 | 7/1999 |
| JP | 2003-220679 A | 8/2003 |

(Continued)

OTHER PUBLICATIONS

Japan Patent Office, International Search Report in International Patent Application No. PCT/JP2021/036622 (Oct. 26, 2021).
(Continued)

*Primary Examiner* — Daniel McNally
(74) *Attorney, Agent, or Firm* — Leydig, Voit & Mayer, Ltd.

(57) ABSTRACT

Disclosed is a biaxially oriented polyester film that is excellent in adhesiveness with a metal layer etc., and excellent in deep drawability for an isotropic shape, such as a square shape. A biaxially oriented polyester film having at least a base layer and an adhesive layer each of which contains a polyester as a main component, the film satisfying the following requirements (1) to (3): (1) a difference between reversible heat capacity difference (ΔCp) at around glass transition temperatures of the adhesive layer and the base layer is not smaller than 0.10 and not larger than 0.45; (2) a molecular orientation ratio measured by using a molecular orientation meter is higher than 1.2; and (3) a stress at 10% elongation (F10) in each of a machine and transverse direction is not lower than 90 MPa and not higher than 160 MPa.

7 Claims, 4 Drawing Sheets

(52) U.S. Cl.
CPC .... *C09J 2301/122* (2020.08); *C09J 2301/312* (2020.08); *C09J 2301/414* (2020.08); *C09J 2400/163* (2013.01)

(56) References Cited

FOREIGN PATENT DOCUMENTS

| | | | |
|---|---|---|---|
| JP | 2014233950 A | * | 12/2014 |
| JP | 2015147309 A | * | 8/2015 |
| JP | 5891792 B2 | | 3/2016 |
| JP | 6177475 B1 | | 8/2017 |
| WO | WO 2022/075259 A1 | | 4/2022 |

OTHER PUBLICATIONS

Japan Patent Office, International Search Report in International Patent Application No. PCT/JP2021/036623 (Oct. 26, 2021).
European Patent Office, Extended European Search Report in European Patent Application No. 21877558.3 (Sep. 2, 2024).
European Patent Office, Extended European Search Report in European Patent Application No. 21877559.1 (Sep. 2, 2024).

* cited by examiner

BIAXIALLY ORIENTED POLYESTER FILM AND LAMINATED BODY

TECHNICAL FIELD

The present invention relates to a polyester film, for molding, to be used in the field of packaging for pharmaceutical products, industrial products, and the like. More specifically, the present invention relates to a laminated polyester film characterized in that, when being laminated with a metal layer, the resultant laminated body has excellent moldability.

BACKGROUND ART

Polyethylene terephthalate (hereinafter, sometimes abbreviated as PET) has been used in a broad range of fields such as food packaging and industrial products since PET has excellent transparency, dimensional stability, mechanical properties, electrical properties, chemical resistance, and the like.

However, as compared to, for example, nylon films, PET is hard and brittle, and thus, is sometimes difficult to mold at the time of deep drawing.

Polybutylene terephthalate (hereinafter, sometimes abbreviated as PBT) has been conventionally used as an engineering plastic because PBT has not only excellent dynamic characteristics and impact resistance but also excellent gas barrier properties and chemical resistance. PBT has a high crystallization rate to have high productivity, and thus, has been used as a material that is useful as an engineering plastic. However, when used for, for example, a stretched film, deterioration of the stretchability thereof, deterioration of transparency thereof, and the like occur owing to crystallization.

Nylon films have been conventionally used for the purpose of molding by making use of excellent dynamic strength and flexibility thereof.

However, there have been problems that nylon films have lower heat resistance than, for example, PET films, and thus, physical properties at high temperature and high humidity decrease owing to thermal degradation, and moreover, dimension changes owing to moisture absorption. Accordingly, nylon films are generally laminated with PET films, for example.

Patent document 1 discloses a polyester film that can be suitably used for cold molding by having a difference of stress at 5% elongation in four directions of the film and a difference of stress at 15% elongation in four directions of the film are 50 MPa or less and 70 MPa, respectively, and an elastic modulus in the range of 2.0 GPa to 3.5 GPa.

A crystalline polyester film tends to have a low moldability and become less likely to have a high laminate strength owing to high crystallinity thereof. Thus, it is anticipated that lamination of the crystalline polyester film with, for example, a metal layer leads to an insufficient adhesiveness therebetween. If the adhesiveness to the metal layer is low, stress generated through drawing is not dispersed during molding. Consequently, deep drawing cannot be performed, and it is highly probable that the crystalline polyester film is unfit for use in deep drawing. In addition, since the elongation in the four directions is close, the orientation is assumed to be relatively isotropic. If the orientation is isotropic, it is likely to be unsuitable for deep drawing when the shape is anisotropic, such as rectangles, which can be suitably used in the present invention.

In Patent document 2, it is disclosed that a polyester film characterized by a stress at 5% elongation (F5) and a stress at 10% (F10) in the machine direction and transverse direction of the film being $1.5 \geq F10/F5 \geq 1.0$ and $F10 \geq 120$ MPa can be suitably used for the purpose of molding.

In order to solve the problem that the lamination strength of a crystalline polyester is low, an easily adhesive coat is provided on the polyester film to increase adhesiveness to a metal layer so that the moldability becomes favorable. However, there are concerns that, when the polyester film is made into a film roll, blocking due to the easily adhesive coat occurs and the transparency deteriorates owing to a lubricant having been added to the easily adhesive coat in order to impart slipperiness. In addition, since the elongation in the machine direction and transverse direction is close, the orientation is assumed to be relatively isotropic. If the orientation is isotropic, it is likely to be unsuitable for deep drawing when the shape is anisotropic, such as rectangles, which can be suitably used in the present invention.

RELATED ART DOCUMENT

Patent Document

Patent Document 1: JP 6177475 B
Patent Document 2: JP 5891792 B

SUMMARY OF THE INVENTION

Problems to be Solved by the Invention

The present invention has been made in view of the problems of the conventional art. That is, an objective of the present invention is to obtain a biaxially oriented polyester film that allows, after being laminated on a metal layer, the resultant laminated body to be suitably used to be subjected to deep drawing.

Means for Solving the Problems

The present inventors conducted thorough studies in order to achieve the objective and have found that a biaxially oriented polyester film that has excellent deep drawability for an anisotropic shape such as rectangles can be obtained by providing an adhesive layer and a base layer for a base material film; and setting a difference between reversible heat capacity differences ($\Delta Cp$) at around glass transition temperatures of the adhesive layer and the base layer, a stress at 10% elongation (F10) in each of a machine direction and a transverse direction, and a molecular orientation ratio to fall within a predetermined range.

The present invention includes the following configurations.

[1] A biaxially oriented polyester film, comprising at least a base layer and an adhesive layer each of which contains a polyester as a main component, wherein the biaxially oriented polyester film satisfies the following requirements (1) to (3):

(1) a difference between reversible heat capacity differences ($\Delta Cp$) at around glass transition temperatures of the adhesive layer and the base layer is not smaller than 0.10 and not larger than 0.45;

(2) the biaxially oriented polyester film has a molecular orientation ratio measured by using a molecular orientation meter, the molecular orientation ratio being higher than 1.2; and (3) the biaxially oriented polyester film has a stress at 10% elongation (F10) in each of a machine direction and a transverse direction, the stress at 10% elongation (F10) being not lower than 90 MPa and not higher than 160 MPa.

[2] The biaxially oriented polyester film according to [1], wherein the base layer contains polyethylene terephthalate in an amount of not lower than 60% by mass with respect to 100% by mass of a resin composition forming the base layer.

[3] The biaxially oriented polyester film according to [2], wherein the base layer contains polyethylene terephthalate in an amount of not lower than 60% by mass and not higher than 90% by mass with respect to 100% by mass of the resin composition forming the base layer and contains polybutylene terephthalate in an amount of not lower than 10% by mass and not higher than 40% by mass with respect to 100% by mass of the resin composition forming the base layer.

[4] The biaxially oriented polyester film according to any one of [1] to [3], wherein
the adhesive layer contains a polyethylene terephthalate resin obtained by copolymerization,
an ethylene terephthalate unit content with respect to the polyester contained in the adhesive layer is not lower than 75% by mole and not higher than 95% by mole, and
a copolymerization component content with respect to the polyester contained in the adhesin layer is not lower than 5% by mole and not higher than 25% by mole.

[5] A laminated body, comprising the biaxially oriented polyester film according to any one of [1] to [4] and a metal layer laminated on the adhesive layer side of the biaxially oriented polyester film.

[6] The laminated body according to [5], wherein the metal layer is an aluminum layer having a thickness of not smaller than 15 μm and not larger than 80 μm.

[7] A packaging material in which the laminated body according to [6] is used.

Effects of the Invention

The present invention provides a biaxially oriented polyester film that is excellent in adhesiveness between layers of a laminated body including a metal layer and that is excellent in deep drawability for an anisotropic shape, such as rectangles.

MODE FOR CARRYING OUT THE INVENTION

Figure 1:
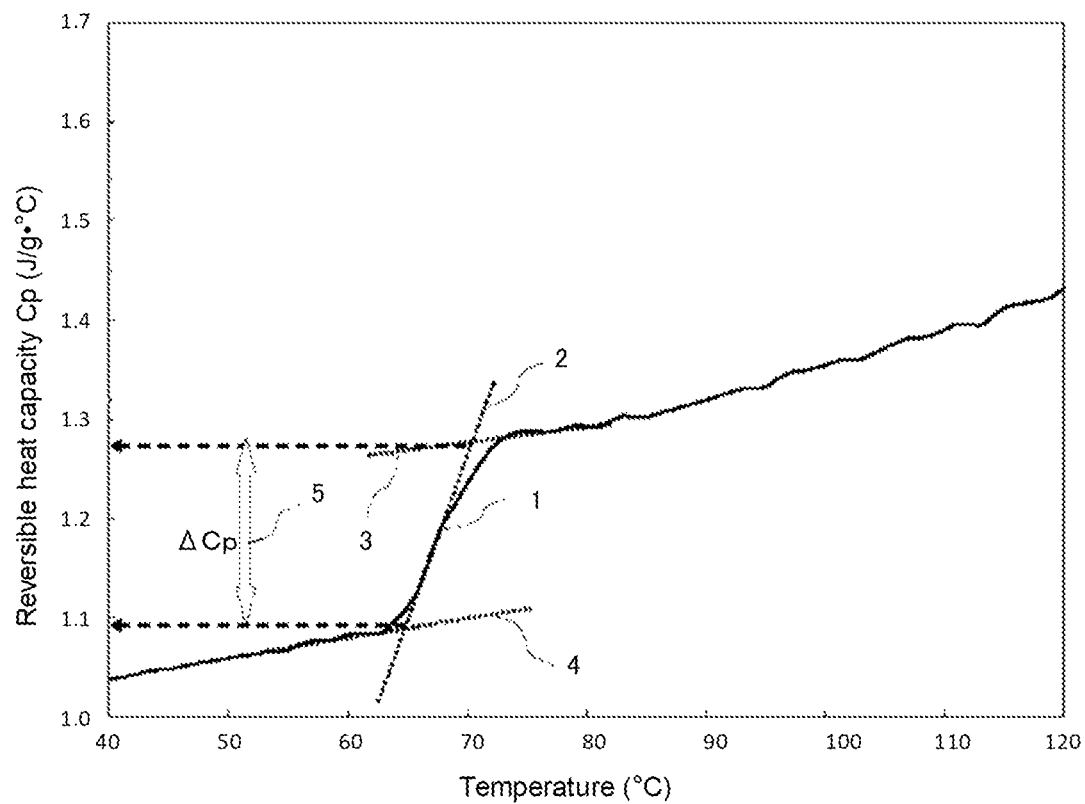
FIG. 1 is a schematic diagram regarding measurement of a reversible heat capacity difference (ΔCp).

A biaxially oriented polyester film of the present invention is a film including at least a base layer and an adhesive layer.

Hereinafter, the present invention will be described in detail.

[Base Layer]

The base layer of the biaxially oriented polyester film of the present invention contains a PET resin as a main component, and the content of the PET resin with respect to 100% by mass of a resin composition forming the base layer is not lower than 60% by mass, preferably 70% by mass, and more preferably 80% by mass. Setting of the content of the PET resin to be not lower than 60% by mass enables the obtained biaxially oriented polyester film to have an increased stress at 10% elongation (F10) in each of a machine direction and a transverse direction and leads to improvement in deep drawability. In addition, the biaxially oriented polyester film comes to have favorable transparency and gives, when printing is performed thereon, a clear view of the print, and thus can be suitably used. Furthermore, since the PET resin, which is comparatively inexpensive, is contained as a main component, cost can be reduced.

A polyester resin (B) other than the PET resin (A) can be contained in the base layer of the biaxially oriented polyester film of the present invention for the purpose of adjusting the dynamic characteristics and the stretchability thereof.

Examples of the polyester resin (B) other than the PET resin (A) include polyester resins such as PBT, polyethylene naphthalate (PEN), polybutylene naphthalate (PBN), and polypropylene terephthalate (PPT). Additional examples of the polyester resin (B) include: polyester resins obtained by copolymerizing dicarboxylic acids such as isophthalic acid, orthophthalic acid, naphthalenedicarboxylic acid, biphenyldicarboxylic acid, cyclohexane dicarboxylic acid, adipic acid, azelaic acid, and sebacic acid; and polyester resins obtained by copolymerizing diol components such as ethylene glycol, 1,3-propylene glycol, 1,2-propylene glycol, neopentyl glycol, 1,5-pentanediol, 1,6-hexanediol, diethylene glycol, cyclohexanediol, polyethylene glycol, polytetramethylene glycol, and polycarbonate diol.

Among these polyester resins (B), PBT has excellent dynamic characteristics, and addition of a small amount of PBT leads to favorable stretchability. In addition, PBT enables decrease in an upper yield stress in a stress-strain curve of the obtained biaxially oriented polyester film. The lower the upper yield stress is, the lower the degree of local stretching is at the time of drawing, and as a result, deep drawing to a larger depth becomes available. In addition, PBT is highly compatible with the PET resin and has excellent transparency, and thus is preferable.

The polyester resin (B) other than the PET resin (A) does not have to be contained. However, containing of the polyester resin (B) in an amount of not lower than 10% by mass enables stretchability at the time of film production to be favorable. In addition, the containing also enables the moldability of the film to be favorable.

Regarding the upper limit of the content of the polyester resin (B) other than the PET resin (A), the content of the polyester resin (B) with respect to 100% by mass of the resin composition forming the base layer is not higher than 40% by mass, preferably not higher than 30% by mass, and more preferably not higher than 20% by mass. Setting of the polyester resin (B) content to be not higher than 40% by mass enables the obtained biaxially oriented polyester film to have an increased stress at 10% elongation (F10) in each of the machine direction and the transverse direction and leads to improvement in deep drawability.

The lower limit of the intrinsic viscosity of the PET resin (A) is preferably 0.45 dl/g, more preferably 0.50 dl/g, and most preferably 0.55 dl/g. Setting of the intrinsic viscosity to be not lower than 0.45 dl/g enables the intrinsic viscosity of the obtained biaxially oriented polyester film to be kept high as well and enables the stress at 10% elongation (F10) in each of the machine direction and the transverse direction to be easily increased.

The upper limit of the intrinsic viscosity of the PET resin (A) is preferably 0.80 dl/g, more preferably 0.75 dl/g, and most preferably 0.70 dl/g. Setting of the intrinsic viscosity to be not higher than 0.80 dl/g can prevent a stress at the time of film stretching from becoming too high, so that favorable film producibility can be obtained.

The intrinsic viscosity of the polyester resin (B) other than the PET resin (A) is preferably an intrinsic viscosity that allows the melt viscosity of the PET resin (A) and the melt viscosity of the polyester resin (B) to be approximately equal to each other in an extruder.

[Adhesive Layer]

The adhesive layer of the biaxially oriented polyester film of the present invention is formed from a resin composition that contains a PET resin as a main component. Containing of the PET resin as a main component can improve adhesiveness to the base layer and prevent the lamination strength from decreasing, which is otherwise due to delamination between the adhesive layer and the base layer.

The adhesive layer of the biaxially oriented polyester film ofin the present invention preferably contains a polyester resin obtained by copolymerization, for the purpose of increasing the adhesiveness of the adhesive layer to a metal layer. Polyethylene terephthalate obtained by copolymerization is particularly preferable.

Examples of the polyester resin obtained by copolymerization include: polyester resins obtained by copolymerizing dicarboxylic acids such as isophthalic acid, orthophthalic acid, naphthalenedicarboxylic acid, biphenyldicarboxylic acid, cyclohexane dicarboxylic acid, adipic acid, azelaic acid, and sebacic acid; and/or polyester resins obtained by copolymerizing diol components such as diethylene glycol, ethylene glycol, 1,3-propylene glycol, 1,2-propylene glycol, neopentyl glycol, 1,5-pentanediol, 1,6-hexanediol, cyclohexanediol, polyethylene glycol, polytetramethylene glycol, and polycarbonate diol.

In the adhesive layer, the lower limit of a copolymerization component content of the polyester resin obtained by copolymerization with respect to the terephthalic acid unit or the ethylene glycol unit of the polyester contained in the adhesive layer is preferably 5 mol %, more preferably 8 mol %, and most preferably 11 mol %. Setting of the copolymerization component content to be not lower than 5 mol % enables the adhesive layer to have an increased reversible heat capacity difference ($\Delta Cp$), enables the obtained biaxially oriented polyester film to have an increased lamination strength, and enables the adhesiveness to a metal layer to be made sufficient.

In the adhesive layer, the upper limit of the copolymerization component content of the polyester resin obtained by copolymerization with respect to the terephthalic acid unit or the ethylene glycol unit of the polyester contained in the adhesive layer is preferably 25 mol %, more preferably 22 mol %, and most preferably 19 mol %. Setting of the copolymerization component content to be not higher than 25 mol % enables inhibition of excessive increase in the reversible heat capacity difference ($\Delta Cp$) of the adhesive layer, and consequently enables inhibition of blocking from occurring when the obtained biaxially oriented polyester film is made into a roll. In addition, the setting enables inhibition of decrease in the stress at 10% elongation (F10) in each of the machine direction and the transverse direction.

The biaxially oriented polyester film of the present invention may contain, in addition to the polyester resin compositions, conventionally known additives, e.g., a lubricant, a stabilizer, a colorant, an antioxidant, an antistatic agent, an ultraviolet absorber, and the like.

The lubricant can be contained in order to adjust the dynamic friction coefficient of the film. Examples of the lubricant include: inorganic fine particle-based lubricants, such as silica, calcium carbonate, and alumina; and moreover, organic-based lubricants. Among these lubricants, silica and calcium carbonate are preferable, and, from the viewpoint of achieving both transparency and slipperiness, porous silica is most preferable.

The lower limit of the lubricant content of the biaxially oriented polyester film of the present invention is preferably 100 ppm by mass, more preferably 300 ppm by mass, and most preferably 500 ppm by mass. Setting of the lubricant content to be not lower than 100 ppm by mass enables the slipperiness of the film to be made favorable.

The upper limit of the lubricant content of the biaxially oriented polyester film in the present invention is preferably 10000 ppm by mass, more preferably 6000 ppm by mass, and most preferably 2000 ppm by mass. Setting of the lubricant content to be not higher than 10000 ppm by mass enables the transparency of the film to be made favorable.

[Method for Producing Biaxially Oriented Polyester Film]

A method for obtaining the biaxially oriented polyester film of the present invention is not particularly limited, but a T-die method is preferable from the viewpoint of obtaining a sufficient stress at 10% elongation (F10) in each of the machine direction and the transverse direction. In an inflation method, owing to the production method therein, a stretch ratio is less likely to increase, whereby F10 may be less likely to increase. In addition, it is difficult to differentiate between orientation in the machine direction and the width direction.

First, raw material resins are melt-extruded by using an extruder to be extruded in the form of a film from a T-die. The film is cast on a cooling roll to be cooled to obtain an unstretched sheet. In order to obtain an unstretched sheet containing at least the resin compositions that form the base layer and the adhesive layer, a co-extrusion method using a feed block, a multi-manifold, etc. is preferably used. Instead of the co-extrusion method, a dry lamination method, an extrusion lamination method, or the like can be also used. In the case of performing lamination with the co-extrusion method, the resin compositions for each layer are preferably selected so that the difference between melt viscosities thereof is small.

The upper limit of the temperature of the cooling roll is preferably 40° C., and the temperature is more preferably not higher than 20° C. When the temperature is not higher than 40° C., the degree of crystallinity at the time of cooling and solidifying the polyester resin composition having been melted is prevented from excessively increasing, and thus, stretching can be more easily performed, and decrease in transparency due to crystallization also can be reduced.

The lower limit of the temperature of the cooling roll is preferably 0° C. When the temperature is not lower than 0° C., the effect of suppressing crystallization at the time of cooling and solidifying the polyester resin compositions having been melted can be sufficiently exhibited. In addition, in the case of setting the temperature of the cooling roll to fall within the above range, it is preferable to reduce the humidity of the environment near the cooling roll to prevent condensation.

The thickness of the unstretched sheet is suitably in a range of not smaller than 15 μm and not larger than 2500 μm. The thickness is more preferably not larger than 600 μm and most preferably not larger than 400 μm.

Next, a stretching method will be described. While the stretching method can be a simultaneous biaxial stretching method or a sequential biaxial stretching method, the sequential biaxial stretching is preferred from a viewpoint of making the difference between the machine direction and the width direction easy to obtain.

The lower limit of a temperature for stretching in the machine direction (hereinafter, also referred to as MD direction) is preferably 90° C., more preferably 95° C., and particularly preferably 100° C. When the temperature is not lower than 90° C., break can be further suppressed.

The upper limit of the temperature for stretching in the MD direction is preferably 140° C., more preferably 135° C., and particularly preferably 130° C. When the temperature is not higher than 140° C., the stress at 10% elongation (F10) in the MD direction can be increased, whereby the deep drawability becomes favorable.

The lower limit of a stretch ratio in the MD direction is preferably 3.5 times, more preferably 3.6 times, and particularly preferably 3.7 times. When the stretch ratio is not lower than 3.5 times, the stress at 10% elongation (F10) in the MD direction can be increased, whereby deep drawability becomes favorable.

The upper limit of the stretch ratio in the MD direction is preferably 4.5 times, more preferably 4.4 times, and particularly preferably 4.3 times. When the stretch ratio is not higher than 4.5 times, the effect of improving the stress at 10% elongation (F10) in the MD direction is sufficiently obtained.

The lower limit of a temperature for stretching in the transverse direction (hereinafter, also referred to as TD direction) is preferably 100° C., more preferably 105° C., and particularly preferably 110° C. When the temperature is not lower than 100° C., break can be made less likely to occur.

The upper limit of the temperature for stretching in the TD direction is preferably 140° C., more preferably 135° C., and particularly preferably 130° C. When the temperature is not higher than 140° C., the stress at 10% elongation (F10) in the TD direction can be increased, whereby the deep drawability becomes favorable.

The lower limit of a stretch ratio in the TD direction is preferably 3.5 times, more preferably 3.6 times, and particularly preferably 3.7 times. When the stretch ratio is not lower than 3.5 times, the stress at 10% elongation (F10) in the TD direction can be increased, whereby deep drawability becomes favorable.

The upper limit of the stretch ratio in the TD direction is preferably 4.5 times, more preferably 4.4 times, and particularly preferably 4.3 times. When the stretch ratio is not higher than 4.5 times, the effect of improving the stress at 10% elongation (F10) in the TD direction is sufficiently obtained.

In the biaxially oriented polyester film of the present invention, an orientation in the MD direction and an orientation in the TD direction are preferably different from each other. The difference in orientation between in the MD direction and in the TD direction can provide favorable deep drawability when a shape resulting from drawing is an anisotropic shape, such as rectangles.

Specifically, the stretch ratio in the MD direction (MD ratio) and the stretch ratio in the TD direction (TD ratio) preferably satisfy the following formula.

TD ratio/MD ratio>1.1

Figure 2:
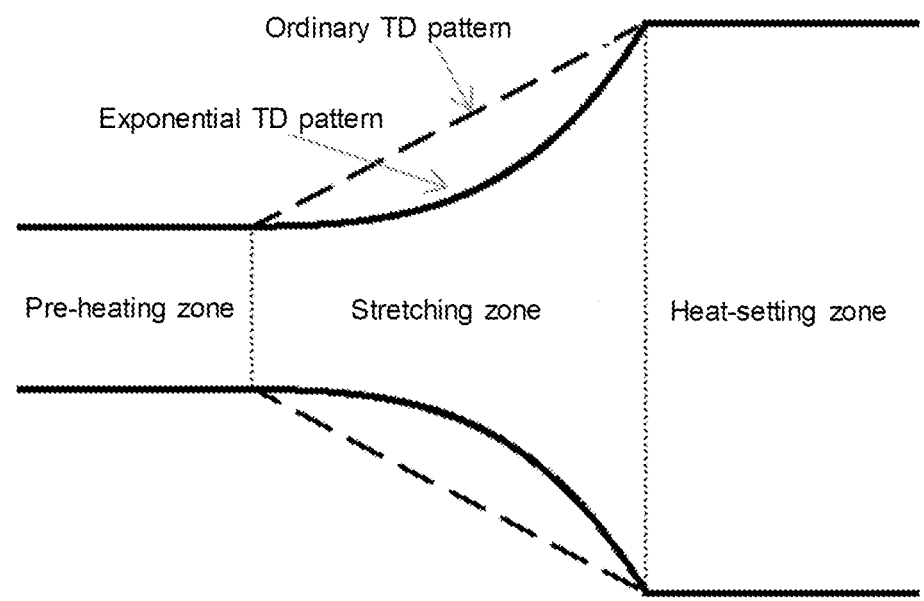
FIG. 2 is a schematic diagram of a stretching pattern, in a transverse direction, that is an exponential pattern.

As another method, a method in which a stretching pattern in the TD direction is made an exponential pattern is also preferable. Specifically, the method is as shown in FIG. 2, and while the normal stretching pattern in the TD direction is linear, the exponential form is a stretching pattern that stretches gently in the first half of the stretching and stretches significantly in the second half of the stretching. By using such a stretching pattern, most of the stretching can be completed in the second half when the film has high stretching stress, which can strengthen the orientation in the TD direction. As a result, difference between the orientation in the MD direction and the orientation in the TD direction is made, resulting in good deep drawability to, for example, a rectangular shape.

Figure 3:
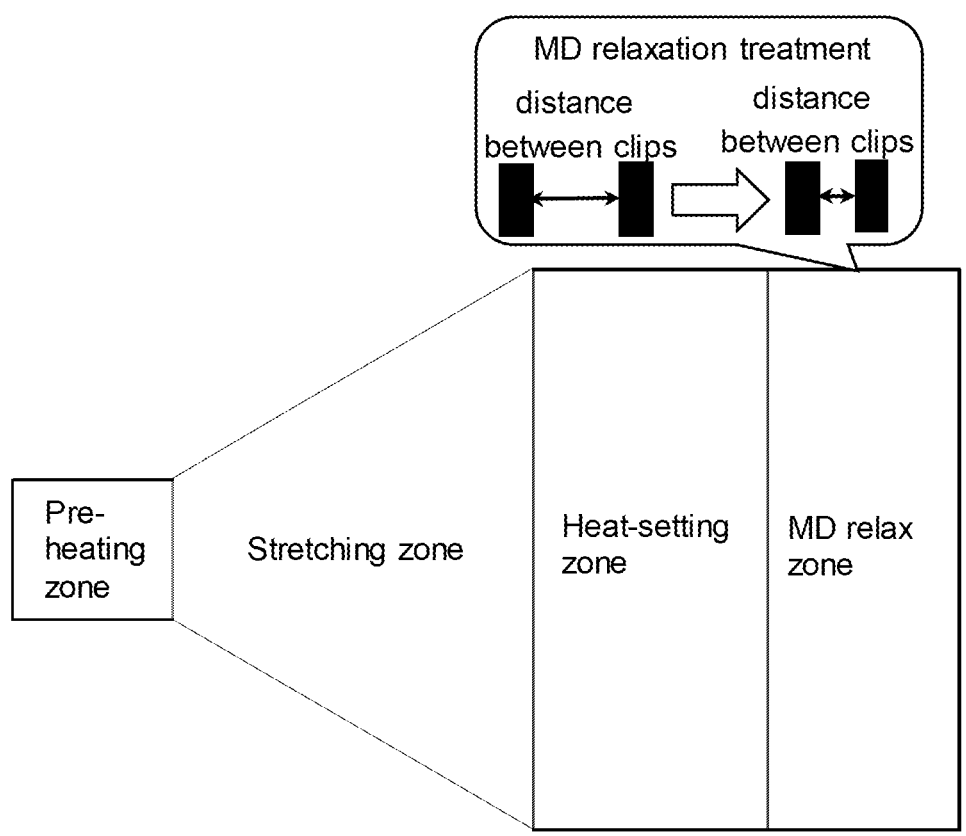
FIG. 3 is a schematic diagram of a method where a relaxation treatment in a MD direction is performed by shrinking the clips in the MD direction.
Figure 4:
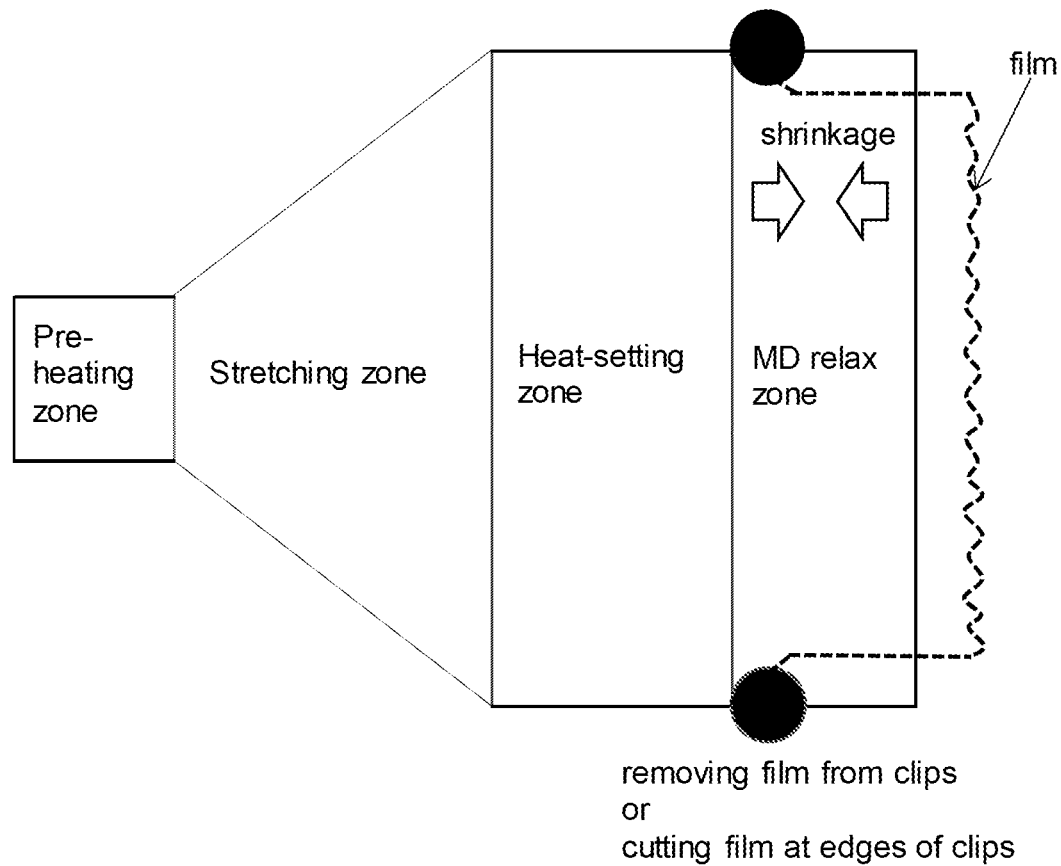
FIG. 4 is a schematic diagram of a method where relaxation treatment in a MD direction is performed by the difference in roll speeds.

As still another method, a method in which a relaxation treatment in the MD direction is performed in the latter half of the TD heat-setting zone is also preferable. By performing the relaxation treatment in the MD direction, the orientation in the MD direction is relaxed. As a result, difference between the orientation in the MD direction and the orientation in the TD direction is made, resulting in good deep drawability to, for example, a rectangular shape. Methods for the relaxation treatment in the MD direction is not particularly limited, and include, for example, as shown in FIG. 3, a method in which the relaxation treatment is performed by shortening the distance between clips that grip the film in the MD direction. As another example, as shown in FIG. 4, a method to relax the film in the MD direction by adjusting the difference in roll speed in the MD direction after removing the film that has been gripped by clips from the clips, or a method to relax the film in the MD direction by adjusting the difference in roll speed in the MD direction after cutting the film that has been gripped by clips in front of the clips are included.

The lower limit of a heat-setting temperature is preferably 170° C., more preferably 175° C., and particularly preferably 180° C. When the heat-setting temperature is not lower than 170° C., a heat shrinkage rate can be more decreased.

The upper limit of the heat-setting temperature is preferably 210° C., more preferably 205° C., and particularly preferably 200° C. When the heat-setting temperature is not higher than 210° C., it is possible to suppress decrease, due to relaxation of molecular orientation, of the stress at 10% elongation (F10) in each of the machine direction and the transverse direction, whereby deep drawability becomes favorable. In addition, the adhesive layer can be inhibited from becoming brittle owing to heat treatment at high temperature, and as a result, the adhesiveness to a metal layer can be inhibited from decreasing.

The lower limit of the relaxation rate in the MD direction is preferably 0.2%, more preferably 0.4%, and particularly preferably 0.6%. When it is not lower than 0.2%, the orientation in the MD direction can be relaxed, which can make the orientation in the MD direction and the orientation in the TD direction different.

The upper limit of the relaxation rate in the MD direction is preferably 3.0%, more preferably 2.8%, and particularly preferably 2.6%. When it is not higher than 3.0%, shrinkage wrinkling can be prevented, whereby flatness can be improved.

The lower limit of the relaxation rate in the TD direction is preferably 0.5%, more preferably 1.0%, and particularly preferably 2.0%. When it is not lower than 0.5%, the heat shrinkage rate in the TD direction can be kept low.

The upper limit of the relaxation rate in the TD direction is preferably 10%, more preferably 8%, and particularly preferably 6%. When it is not higher than 10%, sagging or the like can be prevented from occurring, whereby flatness can be improved.

[Configuration and Characteristics of Biaxially Oriented Polyester Film]

The lower limit of the thickness of the biaxially oriented polyester film of the present invention is preferably 5 µm, more preferably 10 µm, and particularly preferably 15 µm. Setting of the thickness to be not smaller than 5 µm enables the strength of the film to be maintained, whereby deep drawability becomes favorable.

The upper limit of the thickness of the biaxially oriented polyester film in the present invention is preferably 50 µm, more preferably 40 µm, and particularly preferably 30 µm. Setting of the thickness to be not larger than 50 µm enables cold molding.

The lower limit of the thickness of the base layer of the biaxially oriented polyester film of the present invention is preferably 60%, more preferably 70%, and particularly preferably 80% of the thickness of the entire biaxially oriented polyester film. Setting of the thickness to be not lower than 60% enables increase in the stress at 10% elongation (F10) in each of the machine direction and the transverse direction, whereby deep drawability becomes favorable.

The upper limit of the thickness of the base layer of the biaxially oriented polyester film of the present invention is preferably 96%, more preferably 90%, and particularly preferably 86% of the thickness of the entire biaxially oriented polyester film. Setting of the thickness to be not higher than 96% enables obtainment of the effect of improving the adhesiveness of the adhesive layer to a metal layer, whereby deep drawability becomes favorable.

The lower limit of the thickness of the adhesive layer of the biaxially oriented polyester film of the present invention is preferably 4%, more preferably 8%, and particularly preferably 12% of the thickness of the entire biaxially oriented polyester film. By setting the thickness to be not lower than 4% can lead to the effect of improving the adhesiveness to a metal layer, whereby deep drawability becomes favorable.

The upper limit of the thickness of the adhesive layer of the biaxially oriented polyester film of the present invention is preferably 40%, more preferably 30%, and particularly preferably 20% of the thickness of the entire biaxially oriented polyester film. Setting of the thickness to be not higher than 40% can increase the stress at 10% elongation (F10) in each of the machine direction and the transverse direction, whereby deep drawability becomes favorable.

The upper limit of a reversible heat capacity difference ($\Delta Cp$) at around a glass transition temperature of the base layer of the biaxially oriented polyester film of the present invention is preferably 0.05, more preferably 0.03, and particularly preferably 0.01. Setting of the reversible heat capacity difference ($\Delta Cp$) to be not larger than 0.05 makes the base layer sufficiently rigid and can increase the stress at 10% elongation (F10) in each of the machine direction and the transverse direction.

The lower limit of a reversible heat capacity difference ($\Delta Cp$) at around a glass transition temperature of the adhesive layer of the biaxially oriented polyester film of the present invention is preferably 0.10, more preferably 0.15, and particularly preferably 0.20. Setting of the reversible heat capacity difference ($\Delta Cp$) to be not smaller than 0.10 can lead to the effect of improving the adhesiveness to a metal layer, whereby deep drawability becomes favorable.

The upper limit of the reversible heat capacity difference ($\Delta Cp$) at around the glass transition temperature of the adhesive layer of the biaxially oriented polyester film of the present invention is preferably 0.45, more preferably 0.40, and particularly preferably 0.35. Setting of the reversible heat capacity difference ($\Delta Cp$) to be not larger than 0.45 can prevent or reduce blocking when the film is made into a film roll.

The lower limit of the difference between the reversible heat capacity differences ($\Delta Cp$) at around the glass transition temperatures of the base layer and the adhesive layer of the biaxially oriented polyester film of the present invention is preferably 0.10, more preferably 0.15, and particularly preferably 0.20. Setting of the difference therebetween to be not smaller than 0.10 can lead to the effect of improving the adhesiveness to a metal layer. Consequently, deep drawability becomes favorable, and moreover, the base layer becomes sufficiently rigid so that the stress at 10% elongation (F10) in each of the machine direction and the transverse direction can be increased.

The upper limit of the difference between the reversible heat capacity differences ($\Delta Cp$) at around the glass transition temperatures of the base layer and the adhesive layer of the biaxially oriented polyester film of the present invention is preferably 0.45, more preferably 0.40, and particularly preferably 0.35. Setting of the difference therebetween to be not larger than 0.35 can prevent or reduce blocking when the film is made into a film roll.

The reversible heat capacity difference ($\Delta Cp$) at around the glass transition temperature of each layer of the biaxially oriented polyester film in the present invention corresponds to a mobile amorphous content obtained when a reversible heat capacity curve is measured by using a temperature-modulated differential scanning calorimeter. When a reversible heat capacity curve regarding a film sample is measured by using a temperature-modulated differential scanning calorimeter, a baseline of the reversible heat capacity curve is shifted at a temperature corresponding to a glass transition temperature, as in a measurement example shown in FIG. 1. The difference between a value before the shift and a value after the shift is referred to as the reversible heat capacity difference ($\Delta Cp$) and corresponds to a mobile amorphous content by which molecular chains can move at around the glass transition temperature in an amorphous region of the biaxially oriented polyester film.

The difference between the reversible heat capacity differences ($\Delta Cp$) at around the glass transition temperatures of the base layer and the adhesive layer of the biaxially oriented polyester film of the present invention indicates the difference between the mobile amorphous contents of the base layer and the adhesive layer.

The lower limit of the molecular orientation ratio of the biaxially oriented polyester film of the present invention is preferably 1.20 or higher, more preferably 1.23, and particularly preferably 1.26. Setting the molecular orientation ratio to be 1.20 or higher can make deep drawability into, for example, a rectangular shape favorable.

The lower limit of the stress at 10% elongation (F10) in the MD direction of the biaxially oriented polyester film of the present invention is preferably 90 MPa, more preferably 95 MPa, and particularly preferably 100 MPa. Setting of the stress at 10% elongation (F10) to be not lower than 90 MPa enables dispersion of the stress at the time of drawing, whereby deep drawability becomes favorable.

The upper limit of the stress at 10% elongation (F10) in the MD direction of the biaxially oriented polyester film of the present invention is preferably 160 MPa, more preferably 155 MPa, and particularly preferably 150 MPa. Setting of the stress at 10% elongation (F10) to be not higher than 160 MPa can prevent or reduce troubles such as break during film production.

The lower limit of the stress at 10% elongation (F10) in the TD direction of the biaxially oriented polyester film of the present invention is preferably 90 MPa, more preferably 95 MPa, and particularly preferably 100 MPa. Setting of the stress at 10% elongation (F10) to be not lower than 90 MPa enables dispersion of the stress at the time of drawing, whereby deep drawability becomes favorable.

The upper limit of the stress at 10% elongation (F10) in the TD direction of the biaxially oriented polyester film of the present invention is preferably 160 MPa, more preferably 155 MPa, and particularly preferably 150 MPa. Setting of the stress at 10% elongation (F10) to be not higher than 160 MPa can prevent or reduce troubles such as break during film production.

The upper limit of the haze of the biaxially oriented polyester film of the present invention is preferably 5.0%, more preferably 4.5%, and particularly preferably 4.0%. Setting the haze to be not higher than 5.0% is preferably since a print can be clearly seen.

The lower limit of the dynamic friction coefficient of the biaxially oriented polyester film of the present invention is preferably 0.2, more preferably 0.25, and particularly preferably 0.30. Setting of the dynamic coefficient to be not smaller than 0.20 can result in increase in transparency, whereby the appearance becomes favorable.

The upper limit of the dynamic friction coefficient of the biaxially oriented polyester film of the present invention is preferably 0.55, more preferably 0.50, and particularly preferably 0.45. Setting of the dynamic coefficient to be not larger than 0.55 leads to favorable slipperiness of the film and enables inhibition of blocking.

The lower limit of the heat shrinkage rate in the MD direction of the biaxially oriented polyester film of the present invention is preferably 1.0%, more preferably 1.5%, and particularly preferably 2.0%. Setting of the heat shrinkage rate to be not lower than 1.0% can result in increase in the stress at 10% elongation (F10) in the machine direction, whereby deep drawability becomes favorable.

The upper limit of the heat shrinkage rate in the MD direction of the biaxially oriented polyester film of the present invention is preferably 6.0%, more preferably 5.5%, and particularly preferably 5.0%. Setting of the heat shrinkage rate to be not higher than 6.0% enables decrease in troubles regarding machining due to shrinkage of the film in a step such as a printing step.

The lower limit of the heat shrinkage rate in the TD direction of the biaxially oriented polyester film of the present invention is preferably −1.0%, more preferably −0.5%, and particularly preferably 0%. Setting of the heat shrinkage rate to be not lower than −1.0% can result in increase in the stress at 10% elongation (F10) in the transverse direction, whereby deep drawability becomes favorable.

The upper limit of the heat shrinkage rate in the TD direction of the biaxially oriented polyester film of the present invention is preferably 5.0%, more preferably 4.5%, and particularly preferably 4.0%. Setting of the heat shrinkage rate to be not higher than 5.0% enables decrease in troubles regarding machining due to shrinkage of the film in a step such as a printing step.

The biaxially oriented polyester film of the present invention may be subjected to corona discharge treatment, glow discharge treatment, flame treatment, or surface roughening treatment or may be subjected to known anchor coating, printing, decoration, or the like, as long as the object of the present invention is not impaired by doing so.

A print layer may be laminated on the biaxially oriented polyester film of the present invention. As a print ink for forming the print layer, an aqueous and solvent-based resin-containing print ink can be preferably used. Here, examples of the resin used for the print ink include acrylic-based resins, urethane-based resins, polyester-based resins, vinyl chloride-based resins, vinyl acetate copolymer resins, and mixtures of these resins. The print ink may contain known additives such as an antistatic agent, a light-blocking agent, an ultraviolet absorption, a plasticizer, a lubricant, a filler, a colorant, a stabilizer, a lubricating agent, a defoamer, a crosslinking agent, an anti-blocking agent, and an antioxidant.

A printing method for providing the print layer is not particularly limited, and a known printing method such as an offset printing method, a gravure printing method, or a screen printing method can be employed. For drying the solvent after printing, a known drying method such as a hot air drying method, a heat roll drying method, or an infrared drying method can be employed.

The biaxially oriented polyester film of the present invention can be provided with a gas barrier layer such as an inorganic thin film layer or a metal foil layer as long as the object of the present invention is not impaired by doing so.

In the case of using an inorganic thin film layer as the gas barrier layer, the inorganic thin film layer is a thin film made from a metal or an inorganic oxide. The material for forming the inorganic thin film layer is not particularly limited as long as the material can be made into a thin film. From the viewpoint of gas barrier properties, preferable examples of the material include aluminum and inorganic oxides such as a silicon oxide (silica), an aluminum oxide (alumina), and mixtures of the silicon oxide and the aluminum oxide. From the viewpoint of enabling achievement of both flexibility and denseness of the thin film layer, a composite oxide of the silicon oxide and the aluminum oxide is particularly preferable.

In the composite oxide, with the mixture ratio of the silicon oxide and the aluminum oxide being the mass ratio of the metal contents, the Al content is preferably in a range of not lower than 20% and not higher than 70%. When the Al content is not higher than 70%, the inorganic thin film layer can be softened. Consequently, at the time of secondary machining such as printing or lamination, the gas barrier properties can be prevented from decreasing as a result of fracture of the thin film. The silicon oxide mentioned herein refers to any type of silicon oxide such as SiO or $SiO_2$, or a mixture of these silicon oxides. The aluminum oxide mentioned herein refers to any type of aluminum oxide such as AlO or $Al_2O_3$, or a mixture of these aluminum oxides.

The film thickness of the inorganic thin film layer is ordinarily not smaller than 1 nm and not larger than 100 nm and is preferably not smaller than 5 nm and not larger than 50 nm. When the film thickness of the inorganic thin film layer is not smaller than 1 nm, it becomes easy to obtain more satisfactory gas barrier properties. Meanwhile, when the film thickness is not larger than 100 nm, an advantage is obtained in terms of bending resistance and manufacturing cost.

A method for forming the inorganic thin film layer is not particularly limited, and, for example, it is possible to employ, as appropriate, a known vapor deposition method such as: a physical vapor deposition method (PVD method) such as a vacuum deposition method, a sputtering method, or an ion plating method; or a chemical vapor deposition method (CVD method). Hereinafter, a typical method for forming the inorganic thin film layer will be described with a silicon oxide/aluminum oxide-based thin film being taken as an example. In the case of employing, for example, a vacuum deposition method, a mixture of $SiO_2$ and $Al_2O_3$, a mixture of $SiO_2$ and Al, or the like, is preferably used as a raw material to be vapor-deposited. Each of these raw materials to be vapor-deposited is ordinarily used in the form of particles. In this case, the size of each particle is desirably a size that does not lead to any change in pressure at the time of vapor deposition, and a preferable particle diameter is not smaller than 1 mm and not larger than 5 mm. For heating, it is possible to employ a method such as a resistive heating method, a high frequency induction heating method, an electron beam heating method, or a laser heating method. Alternatively, it is also possible to employ a reactive vapor deposition method in which: oxygen gas, nitrogen gas, hydrogen gas, argon gas, carbon dioxide gas, water vapor, or the like is introduced as a reaction gas; or measures such as ozone addition or ion assist is used. Further, film production conditions can also be arbitrarily changed so as to, for example: apply a bias to a body for vapor deposition (a laminated film to be used for vapor deposition); or heat or cool the body for vapor deposition. The vapor deposition materials, reaction gases, application of a bias to the body for vapor deposition, heating/cooling, and the like, can be changed in the same manner also in the case of employing a sputtering method or a CVD method. Further, the print layer may be laminated on the above inorganic thin film layer.

In the case where the biaxially oriented polyester film of the present invention is provided with the inorganic thin film layer, a protective layer is preferably provided on the inorganic thin film layer. The gas barrier layer made from a metal oxide is not a completely dense film, and minute defect portions are interspersed therein. If a particular protective layer resin composition described later is applied on the metal oxide layer so as to form a protective layer, a resin in the protective layer resin composition permeates the defect portions of the metal oxide layer. As a result, an effect of stabilizing the gas barrier properties is obtained. In addition, if a material having gas barrier properties is used also for the protective layer itself, the gas barrier performance of the laminated film is also significantly improved.

Examples of the protective layer include protective layers each obtained by adding a curing agent such as an epoxy-based curing agent, an isocyanate-based curing agent, or a melamine-based curing agent to a resin such as a urethane-based resin, a polyester-based resin, an acrylic-based resin, a titanium-based resin, an isocyanate-based resin, an imine-based resin, or a polybutadiene-based resin. Examples of a solvent used for forming the protective layer include solvents based on aromatic compounds such as benzene and toluene; solvents based on alcohols such as methanol and ethanol; solvents based on ketones such as aceton and methyl ethyl ketone; solvents based on esters such as ethyl acetate and butyl acetate; polyhydric alcohol derivatives such as ethylene glycol monomethyl ether; and the like.

A layer made from another material may be laminated on the biaxially oriented polyester film of the present invention. As a method for the stacking, it is possible to employ: a method in which the layer is laminated after the biaxially oriented polyester film is produced; or a method in which the layer is laminated during film production.

The biaxially oriented polyester film of the present invention can be used as a packaging material by, for example, forming a heat-sealable resin called a sealant (also referred to as sealant layer) on the biaxially oriented polyester film. The sealant layer is ordinarily formed through an extrusion lamination method or a dry lamination method. A thermoplastic copolymer for forming the heat-sealable resin layer only has to be one that can sufficiently exhibit sealant adhesiveness, and it is possible to use a polyethylene resin such as HDPE, LDPE, or LLDPE; a polypropylene resin; an ethylene-vinyl acetate copolymer; an ethylene-α-olefin random copolymer; an ionomer resin; or the like.

The sealant layer may be a single-layer film or a multi-layer film and only has to be selected according to a required function. For example, from the viewpoint of imparting moisture resistance, it is possible to use a multilayer film in which a resin such as an ethylene-cyclic olefin copolymer or polymethylpentene is interposed. In addition, various additives such as a flame retardant, a slipping agent, an anti-blocking agent, an antioxidant, a light stabilizer, and a tackifier may be blended in the sealant layer.

The thickness of the sealant layer is preferably not smaller than 10 μm and not larger than 100 μm and more preferably not smaller than 20 μm and not larger than 60 μm.

A laminated body of the present invention is a laminate obtained by stacking a metal layer on the adhesive layer side of the biaxially oriented polyester film of the present invention. The metal layer may be laminated so as to be in direct contact with the biaxially oriented polyester film of the present invention or may be laminated on the biaxially oriented polyester film with another layer such as an adhesive layer interposed therebetween.

Examples of a metal of the metal layer include various metal elements (aluminum, iron, copper, nickel, and the like), and an aluminum layer is particularly preferable. Although the thickness of the metal layer is not particularly limited, the thickness is preferably not smaller than 15 μm and not larger than 80 μm and particularly preferably not smaller than 20 μm and not larger than 60 μm from the viewpoint of deep drawability.

The laminated body of the present invention obtained by stacking the metal layer on the adhesive layer side of the biaxially oriented polyester film of the present invention has a tensile elongation at break. A higher tensile elongation at break leads to a more favorable deep drawability, and thus is more preferable.

On the metal layer side of the laminated body of the present invention obtained by stacking the metal layer on the adhesive layer side of the biaxially oriented polyester film of the present invention, a sealant layer is further laminated to obtain a laminated body. The obtained laminated body has a tensile elongation at break. The lower limit thereof is preferably 30%, more preferably 32%, and particularly preferably 34%. Setting of the tensile elongation at break to be not lower than 30% enables the laminated body to be sufficiently elongated, whereby deep drawability becomes favorable.

The upper limit of the tensile elongation at break of the above laminated body is preferably 50%, more preferably 48%, and particularly preferably 46%. Setting of the tensile elongation at break to be not higher than 50% enables the dynamic strength of the laminated body to be high, whereby troubles such as formation of a pinhole at the time of deep drawing can be prevented.

EXAMPLES

Next, the present invention will be described in more detail by means of examples. However, the present invention is not limited to the following examples.

[Film Thickness]

The thickness was measured by using a dial gauge in compliance with Method A of JIS K7130-1999.

[Reversible Heat Capacity Difference (ΔCp) at Around Glass Transition Temperature]

A replacement blade for a razor was used as a blade to cut portions out of surfaces of the base layer and the adhesive layer of a biaxially oriented polyester film, and each of the cut portions was used as a measurement sample.

Using a temperature-modulated differential scanning calorimeter (DSC) "DSC250" (manufactured by TA Instruments), 5.0±0.2 mg of the sample weighed out to be put into a hermetic aluminum pan was measured at an average temperature increase rate of 2.0° C./min and at a modulation cycle of 40 seconds in the MDSC (registered trademark) Heat-Only mode to obtain a reversible heat capacity curve. An inflection point in the obtained heat capacity curve was obtained by using attached analysis software (TA Analysis manufactured by TA Instruments), and, as the difference between heat capacities before and after the inflection point (grass transition temperature: abbreviated as Tg), a reversible heat capacity difference was obtained according to the following equation. Here, the above inflection point refers to a point at which the value of differentiating two times is zero in a case where the reversible heat capacity curve is an ideal curve with no concave or convex.

$$\text{Reversible heat capacity difference}(\Delta Cp) = (\text{high-temperature-side heat capacity}) - (\text{low-temperature-side heat capacity})$$

A measurement example for the reversible heat capacity difference was shown in FIG. 1. An extension line of a baseline of the heat capacity curve is drawn on the high-temperature side relative to Tg in the heat capacity curve. A line obtained by performing, through the least-squares method, linear fitting of the baseline of the heat capacity curve within a range from Tg+5° C. to Tg+15° C. is defined as an extension line 3 of the aforementioned baseline of the heat capacity curve on the high-temperature side relative to Tg. Then, an intersection point of the extension line 3 with a tangent line 2 at the inflection point (Tg) is obtained, and the value on the Y axis (reversible heat capacity) at the intersection point is read and used as a high-temperature-side heat capacity. Next, an extension line of a baseline of the heat capacity curve is drawn on the low-temperature side relative to Tg. A line obtained by performing, through the least-squares method, linear fitting of the baseline of the heat capacity curve within a range from Tg−15° C. to Tg−5° C. is defined as an extension line 4 of the aforementioned baseline of the heat capacity curve on the low-temperature side relative to Tg. Then, an intersection point of the extension line 4 with the tangent line 2 at the inflection point 1 (Tg) is obtained, and the value on the Y axis (reversible heat capacity) at the intersection point is read and used as a low-temperature-side heat capacity. Thus, the difference between the values of the high-temperature-side heat capacity and the low-temperature-side heat capacity was defined as a heat capacity difference ΔCp.

It was confirmed that the measurement was able to be normally performed without any disarray in baseline shift of the above reversible heat capacity measurement.

[Molecular Orientation Ratio of Film]

Using an MOA-6004 type molecular orientation meter manufactured by Oji Scientific Instruments, a molecular orientation ratio (the ratio of a maximum value to a minimum value of a transmitted microwave intensity measured by the molecular orientation meter) (maximum value/minimum value) of a sample cut out from a center portion of a biaxially oriented polyester film was obtained. In each of Examples and Comparative examples, the molecular orientation ratio (maximum value/minimum value) was a molecular orientation ratio (a value in the TD direction/a value in the MD direction).

[Stress at 10% Elongation (F10) of Film]

A sample having a width of 15 mm and a length of 180 mm were cut out from a biaxially oriented polyester film. The cut sample was aged for 12 hours in an atmosphere of 23° C. and 65% RH and then measured in an atmosphere of 23° C. and 65% RH and under a condition of a chuck spacing of 100 mm and a tension speed of 360 mm/min. The measurement was repeated five times, and the average value of stresses at which the film was elongated by 10% (stress at 10% elongation) was used. As a measurement device, AUTOGRAPH AG-1 manufactured by Shimadzu Corporation was used.

[Haze of Film]

A biaxially oriented polyester film was cut out into a square shape with each side thereof measuring 10 cm, and haze measurement was performed using a haze meter NDH2000 manufactured by NIPPON DENSHOKU INDUSTRIES Co., Ltd., in compliance with JIS K 7361-1. The haze was measured at three locations, and the average value was regarded as an actually measured haze value.

[Dynamic Friction Coefficient of Film]

A dynamic friction coefficient at the time of joining the front surface and the back surface of each biaxially oriented polyester film was obtained in an environment of 23° C. and 65% RH using a tensile tester (TENSILON RTG-1210 manufactured by A&D Company, Limited) in compliance with JIS K-7125. The weight of a sled (weight), on an upper side, around which the film was wound was 1.5 kg, and the magnitude of the base area of the sled was 39.7 mm². The tension speed at the time of friction coefficient measurement was 200 mm/min.

[Heat Shrinkage Rate of Biaxially Oriented Polyester Film]

Measurement of a heat shrinkage rate was performed according to a dimensional change test method that complies with JIS-C-2318 except that: the test temperature was set to 150° C.; and the heating time was set to 15 minutes.

[Manufacturing of Laminated Body]

On the adhesive layer side of each biaxially oriented polyester film of the present invention, urethane-based two-component curing type adhesives "TAKELAC (registered trademark) A525S" and "TAKENATE (registered trademark) A50" (both of which were manufactured by Mitsui Chemicals, Inc.) were blended in a ratio of 13.5:1.0 (mass ratio), and an aluminum layer ("Aluminum Foil CE 8079" manufactured by TOYO ALUMINIUM K.K.) having a thickness of 40 µm was laminated through a dry lamination method. Subsequently, on the aluminum layer side of the above layered body, in the same manner, the urethane-based two-component curing type adhesives were laminated, and an unstretched polypropylene film ("P1147" manufactured by Toyobo Co., Ltd.) having a thickness of 70 µm was laminated through a dry lamination method. This layered body was aged for four days at 40° C. to obtain a laminate. Lamination of the film and the aluminum layer was performed in such directions that: the machine directions thereof were aligned; and the transverse directions thereof were aligned. Adhesive layers formed from the urethane-based two-component curing type adhesives had a thickness of 4 μm after being dried.

[Tensile Elongation at Break of Laminated Body]

A sample having a width of 15 mm and a length of 180 mm was cut out from the aforementioned laminated body. The cut sample was aged for 12 hours in an atmosphere of 23° C. and 65% RH, and then measured in an atmosphere of 23° C. and 65% RH and under a condition of a chuck spacing of 100 mm and a tension speed of 360 mm/min. The measurement was repeated five times, and the average value of elongations at which the aluminum layer was broken was regarded as the tensile elongation at break of the laminated body. As a measurement device, AUTOGRAPH AG-1 manufactured by Shimadzu Corporation was used.

[Evaluation of Deep Drawability of Laminated Body]

Figure 5:
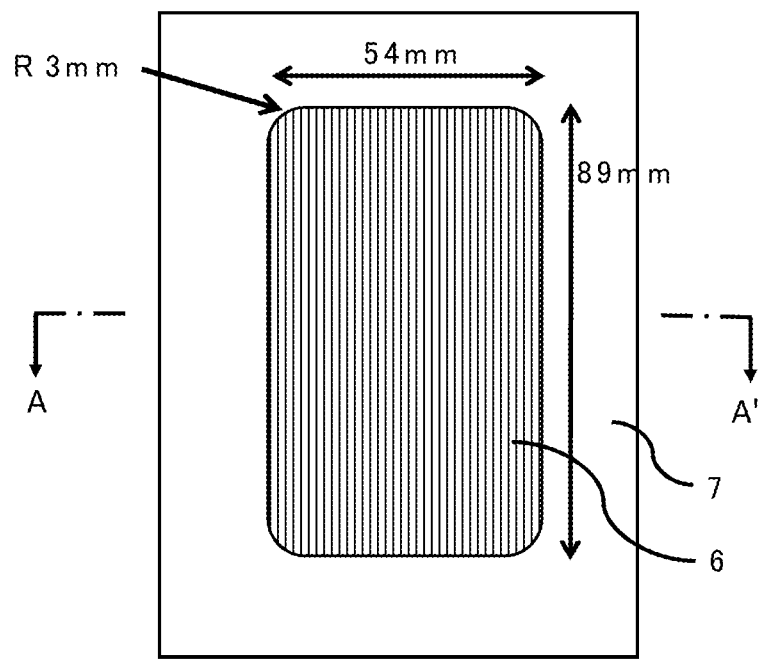
FIG. 5 is a plan view of a mold used for evaluating the deep drawability of laminated bodies.
Figure 6:
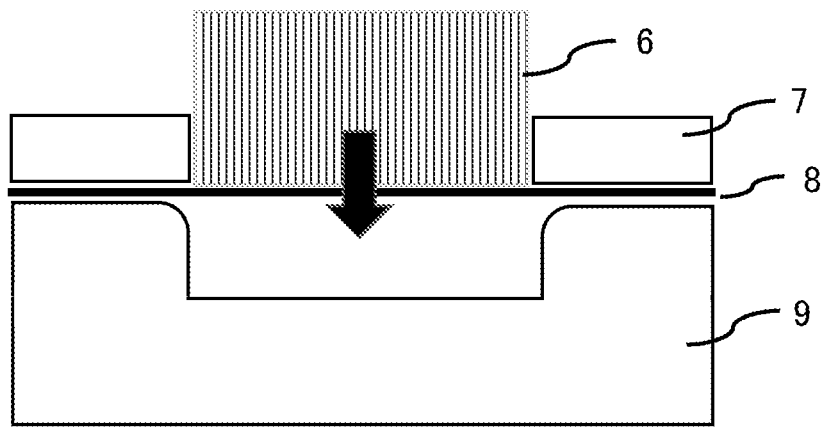
FIG. 6 is a cross-sectional view at A-A' of the mold used for evaluating the deep drawability of laminated bodies.

A sample measuring 15 cm in the machine direction and 10 cm in the transverse direction was cut out from the aforementioned laminated body. The sample was set on a mold shown in FIGS. 5 and 6 in such a way that their machine direction and transverse direction are in line with each other, and was pressed from above to perform drawing. Specifically, the laminated body was placed on the mold having a width (W) of 54 mm, a depth (D) of 54 mm, a height (H) of 12 mm, a roundness R=3 mm at four corners, and a recessed shape, and pressed with a punch having a shape corresponding to the shape of the mold in a state where the laminated body was restrained by a film restrainer. The drawing speed was 6 mm/s.

Drawing was performed to satisfy N=10 with respect to each drawing depth, and a maximum drawing depth obtained when neither a film rupture nor a pinhole was generated at N=10 was regarded as a deep drawing value of the sample.

Example 1

A two-layer configuration including a base layer as a layer A and an adhesive layer as a layer B was obtained. A PET resin (composed of terephthalic acid//ethylene glycol=100//100 (% by mole), having an intrinsic viscosity of 0.62 dl/g, and having silica particles blended therein) and a PBT resin (composed of terephthalic acid//butanediol=100//100 (% by mole) and having an intrinsic viscosity of 1.28 dl/g) were put into an extruder 1 for forming the base layer as the layer A. Next, the PET resin (composed of terephthalic acid//ethylene glycol=100//100 (% by mole), having an intrinsic viscosity of 0.62 dl/g, and having silica particles blended therein) and a PET resin obtained by copolymerization (composed of terephthalic acid//ethylene glycol/diethylene glycol=100//60/40 (% by mole) and having an intrinsic viscosity of 0.62 dl/g) were put into an extruder 2 for forming the base layer as the layer B, in such a ratio that the diethylene glycol component content of the layer B became 17% by mole. In the extruders, the respective resins were melted at 280° C., and then the layer A and the layer B were converged with a convergence device. The resultant resin was cast from a T-die at 280° C. and adhered to a cooling roll at 10° C. by an electrostatic adhesion method to obtain an unstretched sheet having a two-layer configuration. In each of the layers, the silica particle content with respect to 100% by mass of the entire resin composition in each layer was 0.1% by mass as a silica concentration.

Subsequently, the obtained unstretched sheet was stretched by 4.0 times in the MD direction at a temperature of 115° C., and passed through a tenter with a stretching pattern of linear pattern to stretch by 4.6 times in the TD direction at 110° C., and, at 190° C., subjected to heat setting treatment for 3 seconds and 5% relaxation treatment for 1 second to obtain a biaxially oriented polyester film having a thickness of 25 μm. The resin composition of the biaxially oriented polyester film and the film production conditions are shown in Table 1. In addition, physical properties and evaluation results of the obtained film are shown in Table 1.

Example 2

A biaxially oriented polyester film having a thickness of 25 μm was obtained by film forming in the same manner as in Example 1 except changing the stretching pattern of the tenter to an exponential pattern. Physical properties and evaluation results of the obtained film are shown in Table 1.

Example 3

A MD relaxation treatment was performed by shortening the distance between the TD clips after the heat setting treatment in the tenter. The relaxation rate in the MD direction was set to be 3%. By film forming in the same manner as in Example 1 except the above, a biaxially oriented polyester film having a thickness of 25 m was obtained. Physical properties and evaluation results of the obtained film are shown in Table 1.

Examples 4, 5

A biaxially oriented polyester film having a thickness of 25 μm was obtained by film forming in the same manner as in Example 1 except changing the weight proportions of the raw materials put into the extruder 2 such that the amount of the diethylene glycol component in the layer B became as shown in Table 1. Physical properties and evaluation results of the obtained film are shown in Table 1.

Example 6

A biaxially oriented polyester film having a thickness of 25 μm was obtained by forming in the same manner as in Example 1 except changing the thickness of the layer A and the layer B to the thickness shown in Table 1. Physical properties and evaluation results of the obtained film are shown in Table 1.

TABLE 1

|  |  |  |  |  |  | Examples | | | | | |
|---|---|---|---|---|---|---|---|---|---|---|---|
|  |  |  |  |  |  | 1 | 2 | 3 | 4 | 5 | 6 |
| Resin composition | Base layer (Layer A) | Composition ratio |  | PET | % by mass | 80 | 80 | 80 | 80 | 80 | 80 |
|  |  |  |  | PBT |  | 20 | 20 | 20 | 20 | 20 | 20 |
|  |  | Thickness |  |  | μm | 23 | 23 | 23 | 23 | 23 | 15 |

TABLE 1-continued

|  |  |  |  | Examples | | | | | |
|---|---|---|---|---|---|---|---|---|---|
|  |  |  |  | 1 | 2 | 3 | 4 | 5 | 6 |
| | Adhesive layer (Layer B) | Copolymerization component ratio | DEG | % by mole | 17 | 17 | 17 | 5 | 25 | 17 |
| | | | NPG | | — | — | — | — | — | — |
| | | Thickness | | μm | 2 | 2 | 2 | 2 | 2 | 10 |
| | Total film thickness | | | μm | 25 | 25 | 25 | 25 | 25 | 25 |
| Stretch condition | MD stretch ratio | | | times | 4.0 | 4.0 | 4.0 | 4.0 | 4.0 | 4.0 |
| | 1-st stage TD stretch ratio | | | times | 4.6 | 4.6 | 4.6 | 4.6 | 4.6 | 4.6 |
| | 2-nd stage TD stretch ratio | | | times | — | — | — | — | — | — |
| | Ratio between stretch ratios (TD/MD) | | | — | 1.15 | 1.15 | 1.15 | 1.15 | 1.15 | 1.15 |
| | TD stretch pattern | | | — | Linear pattern | Exponential pattern | Linear pattern | Linear pattern | Linear pattern | Linear pattern |
| | Heat-setting temperature | | | °C. | 190 | 190 | 190 | 190 | 190 | 190 |
| | TD relaxation rate | | | % | 5 | 5 | 5 | 5 | 5 | 5 |
| | MD relaxation rate | | | % | — | — | 2 | — | — | — |
| ΔCp at around glass transition temperature | | Base layer | | J/g·°C. | 0 | 0 | 0 | 0 | 0 | 0 |
| | | Adhesive layer | | | 0.246 | 0.233 | 0.225 | 0.133 | 0.442 | 0.251 |
| | | Difference between the layers | | | 0.246 | 0.233 | 0.225 | 0.133 | 0.442 | 0.251 |
| Molecular orientation ratio | | | | — | 1.25 | 1.35 | 1.32 | 1.27 | 1.23 | 1.21 |
| Stress at 10% elongation (F10) | | MD | | Mpa | 107 | 106 | 94 | 116 | 99 | 92 |
| | | TD | | | 130 | 149 | 131 | 145 | 119 | 122 |
| Haze | | | | % | 3.4 | 3.3 | 3.2 | 3.1 | 3.7 | 3.7 |
| Dynamic friction coefficient | | | | — | 0.42 | 0.40 | 0.38 | 0.39 | 0.45 | 0.46 |
| Heat shrinkage rate | | MD | | % | 4.0 | 4.3 | 2.2 | 3.4 | 4.7 | 5.4 |
| | | TD | | | 3.7 | 4.1 | 2.2 | 3.9 | 3.3 | 4.7 |
| Tensile elongation at break of laminated body | | MD | | % | 37 | 38 | 32 | 37 | 35 | 31 |
| | | TD | | | 43 | 46 | 39 | 41 | 42 | 32 |
| Deep drawability | | | | mm | 4.5 | 4.7 | 4.2 | 4.3 | 4.2 | 3.5 |

Example 7

A biaxially oriented polyester film having a thickness of 25 μm was obtained by film forming in the same manner as in Example 1 except using PET resin (composed of terephthalic acid//ethylene glycol=100//100 (mol %), having an intrinsic viscosity of 0.62 dl/g, and having silica particles blended therein) and a PET resin obtained by copolymerization (composed of terephthalic acid//ethylene glycol/neopentyl glycol=100//60/40 (mol %) and having an intrinsic viscosity of 0.62 dl/g) as resins to be put into the extruder 2 for forming the layer B. Physical properties and evaluation results of the obtained film are shown in Table 1.

Examples 8, 9

A biaxially oriented polyester film having a thickness of 25 μm was obtained by film forming in the same manner as in Example 1 except changing the film production conditions to those shown in Table 1. Physical properties and evaluation results of the obtained film are shown in Table 1.

Examples 10, 11

A biaxially oriented polyester film having a thickness of 25 μm was obtained by film forming in the same manner as in Example 1 except changing the resin composition in the layer A to the rate shown in Table 1. Physical properties and evaluation results of the obtained film are shown in Table 1.

TABLE 2

|  |  |  |  |  | Examples | | | | |
|---|---|---|---|---|---|---|---|---|---|
|  |  |  |  |  | 7 | 8 | 9 | 10 | 11 |
| Resin composition | Base layer (Layer A) | Composition ratio | PET | % by mass | 80 | 80 | 80 | 60 | 100 |
| | | | PBT | | 20 | 20 | 20 | 40 | 0 |
| | | Thickness | | μm | 23 | 23 | 23 | 23 | 23 |
| | Adhesive layer (Layer B) | Copolymerization component ratio | DEG | % by mole | — | 17 | 17 | 17 | 17 |
| | | | NPG | | 17 | — | — | — | — |
| | | Thickness | | μm | 2 | 2 | 2 | 2 | 2 |
| | Total film thickness | | | μm | 25 | 25 | 25 | 25 | 25 |
| Stretch condition | MD stretch ratio | | | times | 4.0 | 3.8 | 4.0 | 4.0 | 4.0 |
| | 1-st stage TD stretch ratio | | | times | 4.6 | 4.2 | 4.6 | 4.6 | 4.6 |
| | 2-nd stage TD stretch ratio | | | times | — | — | — | — | — |
| | Ratio between stretch ratios (TD/MD) | | | — | 1.15 | 1.11 | 1.15 | 1.15 | 1.15 |
| | TD stretch pattern | | | — | Linear pattern | Linear pattern | Linear pattern | Linear pattern | Linear pattern |
| | Heat-setting temperature | | | °C. | 190 | 190 | 210 | 190 | 190 |
| | TD relaxation rate | | | % | 5 | 5 | 5 | 5 | 5 |
| | MD relaxation rate | | | % | — | — | — | — | — |

TABLE 2-continued

|  |  |  | Examples | | | | |
| --- | --- | --- | --- | --- | --- | --- | --- |
|  |  |  | 7 | 8 | 9 | 10 | 11 |
| ΔCp at around glass transition temperature | Base layer | J/g · ° C. | 0 | 0 | 0 | 0 | 0 |
|  | Adhesive layer |  | 0.249 | 0.311 | 0.211 | 0.244 | 0.245 |
|  | Difference between layers |  | 0.249 | 0.311 | 0.211 | 0.244 | 0.245 |
| Molecular orientation ratio |  | — | 1.26 | 1.21 | 1.21 | 1.22 | 1.29 |
| Stress at 10% elongation (F10) | MD | Mpa | 109 | 92 | 92 | 106 | 151 |
|  | TD |  | 131 | 103 | 121 | 125 | 141 |
| Haze |  | % | 3.1 | 2.9 | 3.3 | 3.7 | 2.9 |
| Dynamic friction coefficient |  | — | 0.40 | 0.39 | 0.45 | 0.41 | 0.38 |
| Heat shrinkage rate | MD | % | 4.0 | 3.2 | 2.0 | 4.5 | 3.9 |
|  | TD |  | 3.9 | 2.2 | 1.3 | 3.9 | 3.5 |
| Tensile elongation at break of laminated body | MD | % | 38 | 31 | 30 | 33 | 37 |
|  | TD |  | 42 | 32 | 35 | 40 | 44 |
| Deep drawability |  | mm | 4.4 | 3.5 | 4.2 | 4.3 | 4.4 |

Comparative Example 1

A biaxially oriented polyester film having a thickness of 25 μm was obtained by film forming in the same manner as Example 1 except changing the weight proportions of the raw materials put into the extruder 2 such that the amount of the diethylene glycol component in the layer B became the value shown in Table 1. The obtained film had small difference in ΔCp and insufficient adhesiveness, resulting in a laminated body having low tensile elongations at break and an insufficient deep drawability.

Comparative Example 2

A biaxially oriented polyester film having a thickness of 25 μm was obtained by film forming in the same manner as Example 1 except changing the weight proportions of the raw materials put into the extruder 2 such that the amount of the diethylene glycol component in the layer B became the value shown in Table 1. The obtained film had low F10, and the laminated body had low tensile elongations at break and an insufficient deep drawability.

Comparative Example 3

A biaxially oriented polyester film having a thickness of 25 μm was obtained by film forming in the same manner as Example 1 except that only the layer A was used as a single layer configuration. The obtained film had no difference in ΔCp and insufficient adhesiveness, resulting in a laminated body having low tensile elongations at break and an insufficient deep drawability.

Comparative Example 4

A biaxially oriented polyester film having a thickness of 25 m was obtained by film forming in the same manner as Example 1 except changing the thickness of the layer A and the layer B to those shown in Table 1. The obtained film had low F10, and not only was the tensile elongation at break of the laminated body low, but the molecular orientation was also poor, resulting in an insufficient deep drawability.

Comparative Example 5

A biaxially oriented polyester film having a thickness of 25 μm was obtained by film forming in the same manner as Example 1 except changing the film production conditions to those shown in Table 1. The obtained film had inappropriate molecular orientation, and therefore, the laminated body had insufficient deep drawability.

Comparative Example 6

A biaxially oriented polyester film having a thickness of 25 μm was obtained by film forming in the same manner as Example 1 except changing the film production conditions to those shown in Table 1. The obtained film had low F10, and therefore, the laminated body had low tensile elongations at break, resulting in an insufficient deep drawability.

Comparative Example 7

A biaxially oriented polyester film having a thickness of 25 μm was obtained by film forming in the same manner as in Example 1 except changing the resin composition in the layer A to the rate shown in Table 1. The obtained film had low F10, and not only was the tensile elongation at break of the laminated body low, but the molecular orientation was also inappropriate, resulting in an insufficient deep drawability.

TABLE 3

|  |  |  |  |  | Comparative Examples | | | | | | |
| --- | --- | --- | --- | --- | --- | --- | --- | --- | --- | --- | --- |
|  |  |  |  |  | 1 | 2 | 3 | 4 | 5 | 6 | 7 |
| Resin composition | Base layer (Layer A) | Composition ratio | PET | % by mass | 80 | 80 | 80 | 80 | 80 | 80 | 40 |
|  |  |  | PBT |  | 20 | 20 | 20 | 20 | 20 | 20 | 60 |
|  |  | Thickness |  | μm | 23 | 23 | 25 | 10 | 23 | 23 | 23 |
|  | Adhesive layer (Layer B) | Copolymerization component ratio | DEG | % by mole | 3 | 30 | — | 17 | 17 | 17 | 17 |
|  |  |  | NPG |  | — | — | — | — | — | — | — |
|  |  | Thickness |  | μm | 2 | 2 | — | 15 | 2 | 2 | 2 |
|  | Total film thickness |  |  | μm | 25 | 25 | 25 | 25 | 25 | 25 | 25 |

TABLE 3-continued

| | | | Comparative Examples | | | | | | |
|---|---|---|---|---|---|---|---|---|---|
| | | | 1 | 2 | 3 | 4 | 5 | 6 | 7 |
| Stretch condition | MD stretch ratio | times | 4.0 | 4.0 | 4.0 | 4.0 | 4.0 | 4.0 | 4.0 |
| | 1-st stage TD stretch ratio | times | 4.6 | 4.6 | 4.1 | 4.6 | 4.3 | 4.6 | 4.6 |
| | 2-nd stage TD stretch ratio | times | — | — | — | — | — | — | — |
| | Ratio between stretch ratios (TD/MD) | — | 1.15 | 1.15 | 1.15 | 1.15 | 1.15 | 1.15 | 1.15 |
| | TD stretch pattern | — | Linear pattern | Exponential pattern | Linear pattern | Linear pattern | Linear pattern | Linear pattern | Linear pattern |
| | Heat-setting temperature | °C. | 190 | 190 | 190 | 190 | 190 | 220 | 190 |
| | TD relaxation rate | % | 5 | 5 | 5 | 5 | 5 | 5 | 5 |
| | MD relaxation rate | % | — | — | — | — | — | — | — |
| ΔCp at around glass transition temperature | Base layer | J/g·°C. | 0 | 0 | 0 | 0 | 0 | 0 | 0 |
| | Adhesive layer | | 0.097 | 0.551 | 0 | 0.310 | 0.294 | 0.210 | 0.299 |
| | Difference between layers | | 0.097 | 0.551 | 0 | 0.310 | 0.294 | 0.210 | 0.299 |
| Molecular orientation ratio | | — | 1.27 | 1.21 | 1.28 | 1.16 | 1.18 | 1.23 | 1.18 |
| Stress at 10% elongation (F10) | MD | Mpa | 123 | 83 | 120 | 77 | 107 | 87 | 87 |
| | TD | | 144 | 93 | 141 | 96 | 121 | 95 | 110 |
| Haze | | % | 2.7 | 3.9 | 2.9 | 4.3 | 3.5 | 3.1 | 3.8 |
| Dynamic friction coefficient | | — | 0.39 | 0.51 | 0.41 | 0.51 | 0.41 | 0.48 | 0.45 |
| Heat shrinkage rate | MD | % | 3.1 | 5.1 | 3.2 | 5.9 | 4.2 | 1.5 | 4.3 |
| | TD | | 2.9 | 4.4 | 2.8 | 5.9 | 3.2 | 1.4 | 3.9 |
| Tensile elongation at break of laminated body | MD | % | 28 | 27 | 24 | 24 | 40 | 28 | 27 |
| | TD | | 30 | 31 | 25 | 26 | 41 | 31 | 40 |
| Deep drawability | | mm | 3.4 | 3.1 | 3.0 | 2.9 | 2.9 | 3.3 | 3.3 |

DESCRIPTION OF REFERENCE SIGNS

1 inflection point (Tg)
2 tangent line at inflection point (Tg)
3 extension line of baseline of heat capacity curve on high-temperature side
4 extension line of baseline of heat capacity curve on low-temperature side
5 reversible heat capacity difference (ΔCp) at around glass transition temperature
6 punch
7 film restrainer
8 film laminated body

The invention claimed is:

1. A biaxially oriented polyester film, comprising at least a base layer and an adhesive layer each of which contains a polyester as a main component, wherein
the biaxially oriented polyester film satisfies the following requirements (1) to (3):
(1) a difference between reversible heat capacity differences (ΔCp) at around glass transition temperatures of the adhesive layer and the base layer is not smaller than 0.10 and not larger than 0.45;
(2) the biaxially oriented polyester film has a molecular orientation ratio measured by using a molecular orientation meter, the molecular orientation ratio being higher than 1.2; and
(3) the biaxially oriented polyester film has a stress at 10% elongation (F10) in each of a machine direction and a transverse direction, the stress at 10% elongation (F10) being not lower than 90 MPa and not higher than 160 MPa.

2. The biaxially oriented polyester film according to claim 1, wherein the base layer contains polyethylene terephthalate in an amount of not lower than 60% by mass with respect to 100% by mass of a resin composition forming the base layer.

3. The biaxially oriented polyester film according to claim 2, wherein the base layer contains polyethylene terephthalate in an amount of not lower than 60% by mass and not higher than 90% by mass with respect to 100% by mass of the resin composition forming the base layer and contains polybutylene terephthalate in an amount of not lower than 10% by mass and not higher than 40% by mass with respect to 100% by mass of the resin composition forming the base layer.

4. The biaxially oriented polyester film according to claim 1, wherein
the adhesive layer contains a polyethylene terephthalate resin obtained by copolymerization,
an ethylene terephthalate unit content with respect to the polyester contained in the adhesive layer is not lower than 75% by mole and not higher than 95% by mole, and
a copolymerization component content with respect to the polyester contained in the adhesin layer is not lower than 5% by mole and not higher than 25% by mole.

5. A laminated body, comprising the biaxially oriented polyester film according to claim 1 and a metal layer laminated on the adhesive layer side of the biaxially oriented polyester film.

6. The laminated body according to claim 5, wherein the metal layer is an aluminum layer having a thickness of not smaller than 15 μm and not larger than 80 μm.

7. A packaging material in which the laminated body according to claim 6 is used.

* * * * *